United States Patent [19] [11] 3,798,375
Delisle [45] Mar. 19, 1974

[54] SILENT ALARM SYSTEM AND MEANS FOR DIRECTING AIRBORNE PERSONNEL TO EMERGENCY SITE

[76] Inventor: Gaston A. Delisle, 15935 Skytop Rd., Encino, Calif. 91316

[22] Filed: July 12, 1972

[21] Appl. No.: 271,171

Related U.S. Application Data

[63] Continuation-in-part of Ser. No. 170,587, Aug. 10, 1971, which is a continuation-in-part of Ser. No. 849,073, Aug. 11, 1969.

[52] U.S. Cl. .................. 179/2 R, 179/5 R, 340/224, 340/371, 343/107
[51] Int. Cl. .......................................... H04m 11/04
[58] Field of Search ......... 179/5 P, 5 R; 340/23, 24, 340/371, 224; 343/107, 108 R, 100 CS, 343/112 R

[56] References Cited

UNITED STATES PATENTS 3,598,918 8/1971 Dee .................................... 179/5 P
3,624,635 11/1971 Less .................................. 340/371

*Primary Examiner*—Ralph D. Blakeslee
*Attorney, Agent, or Firm*—Sellers & Brace

[57] ABSTRACT

An emergency alarm system utilizing a telephone system to relay pertinent information to public officials including the address and a pair of direction finder vectors from local direction finger range stations which sectors intersect at the point of emergency and useful to airborne emergency personnel in proceeding to the site. The alarm includes a plurality of sensors any one of which is effective to activate a cycling mechanism to signal the phone system operator to connect local officials and silently relay the emergency information for a period of time following which the components are automatically conditioned for the next operating cycle. The alarm includes a blinking beacon located exteriorly of the premises to pinpoint the premises to airborne personnel.

18 Claims, 2 Drawing Figures

Figure 1:
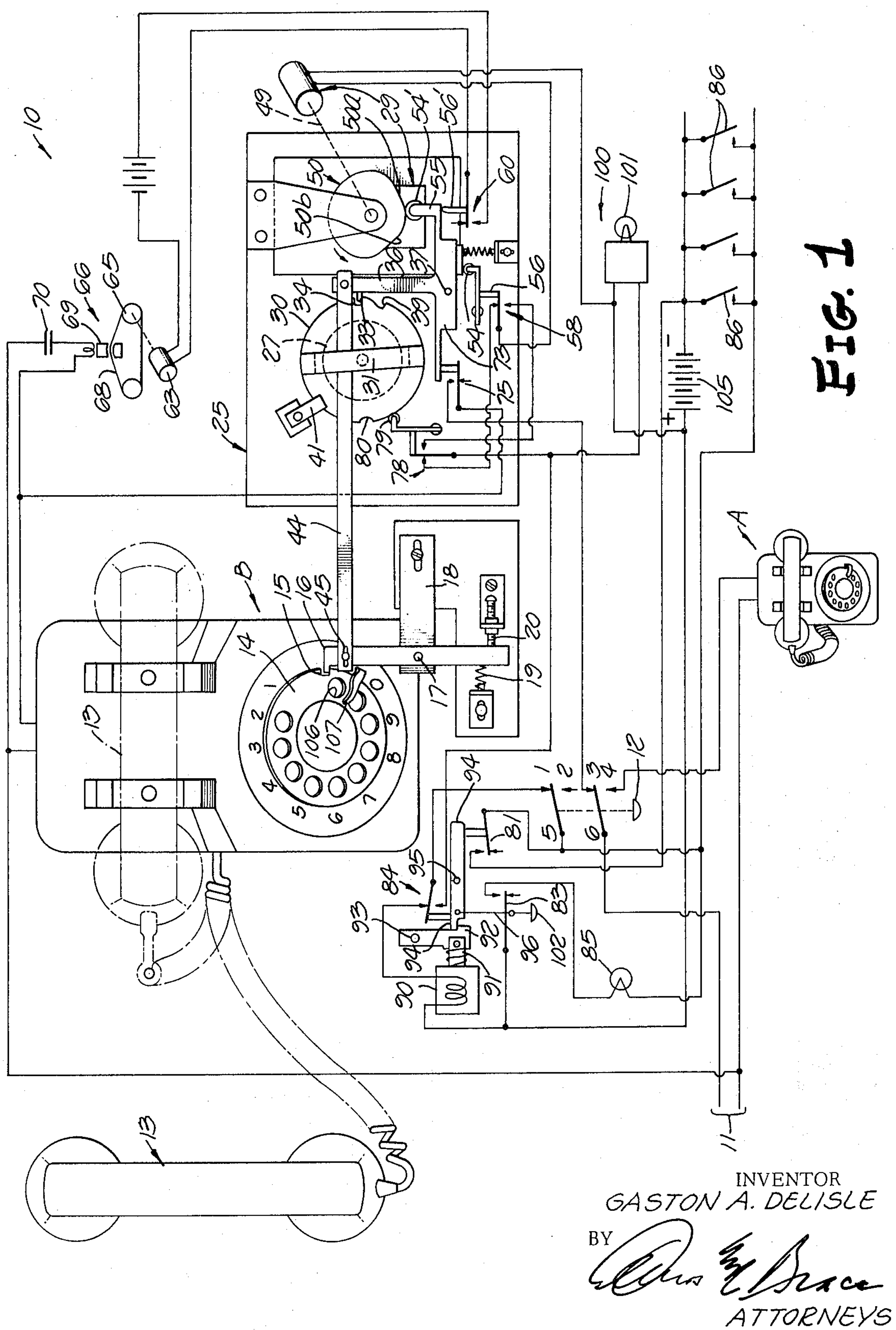

INVENTOR
GASTON A. DELISLE
BY
ATTORNEYS

SILENT ALARM SYSTEM AND MEANS FOR DIRECTING AIRBORNE PERSONNEL TO EMERGENCY SITE

This application is a continuation-in-part of my copending application for U.S. letters Pat. Ser. No. 170,587, filed Aug. 10, 1971 which in turn is a continuation-in-part of the then copending application for U.S. letters Pat. Ser. No. 849,073, filed Aug. 11, 1969.

The invention relates to alarm systems and more particularly to a unique system utilizing a conventional phone set and message reproducing means to signal the phone operator and summon police officials or the like to a designated address utilizing recorded direction finder vectors from local direction finder range stations to expedite response to the emergency and further aided by flashing beacon means visible from a long distance.

Proposals have been made heretofore for utilizing a public telephone circuit in combination with burglar detection means to signal authorities when prowler detection or other emergency condition sensor means are activated. Such prior systems are subject to numerous shortcomings and disadvantages limiting their usefulness and reliability. Although such prior systems possess the capability of reporting the emergency with dispatch they lack adequate provision utilizing direction finder facilities for routing answering emergency personnel to the site. Existing systems are also characterized by the complexity and high initial as well as maintenance costs. They also utilize recorded messages which are reproduced audibly for pickup by the telephone microphone and likely to be intercepted by intruders thereby forewarning them that police are being summoned.

The present invention avoids the foregoing and other disadvantages of prior systems and provides a simple, inexpensive highly reliable apparatus located on the premises being monitored and, in addition, having provision for utilizing highly refined and reliable telephone and direction finder equipment in a unique manner. Typically, simple magnetic message reproducing means equipped with a recycling tape message is coupled to the local phone circuit. Release of the signalling means is controlled by any desired number of emergency detectors or sensors distributed about the premises being monitored and the activation of any one of which is effective to activate a circuit to alert the operator at a central station while initiating operation of the tape reproducer and associated timing means to time the duration of a repeated message and, thereafter to recondition certain of the components for the next emergency sensing cycle. The circuit also operates to activate a powerful blinking beacon to guide airborne officials to the scene.

The recorded message includes not only the address of the site or premises but in particular, a pair of direction finder vectors from specified local direction finder range stations which vectors intersect at the site of the emergency thereby enabling airborne emergency personnel equipped with direction finding equipment to proceed directly to that site. The alarm includes a master switch which serves to deactivate other phones on the premises whenever the alarm is in operation and reactivates the latter when shifted to its alternate position when the occupants return without disturbing the readiness of the alarm to function as soon as the master switch is again reversed.

It is therefore a primary object of the present invention to provide an improved and unique alarm system utilizing a phone set to receive and transmit a silent message to officials over a public phone system whenever the alarm detects an emergency condition.

Another object of the invention is the provision of a simple, inexpensive alarm system having provision for identifying the site of the alarm and for guiding airborne officials to the site using local direction finder equipment.

Another object of the invention is the provision of an alarm system having means for storing direction finder vector information and for transmitting this information to selected officials and utilizing this information and the aid of range station facilities to guide airborne emergency personnel to the scene.

Another object of the invention is the provision of an alarm system operable to provide airborne police with immediate direction finder vector information coupled with the operation of a flashing light at the site of the emergency to guide personnel directly to the site of the alarm.

Another object of the invention is the provision of an alarm system utilizing a public phone system to summon the police via an electronically transmitted message without interfering with normal use of the phone circuit when the alarm is not in use and which remains in readiness for monitoring the premises for emergencies while the occupants are absent from the premises.

These and other more specific objects will appear upon reading the following specification and claims and upon considering in connection therewith the attached drawing to which they relate.

Figure 2:
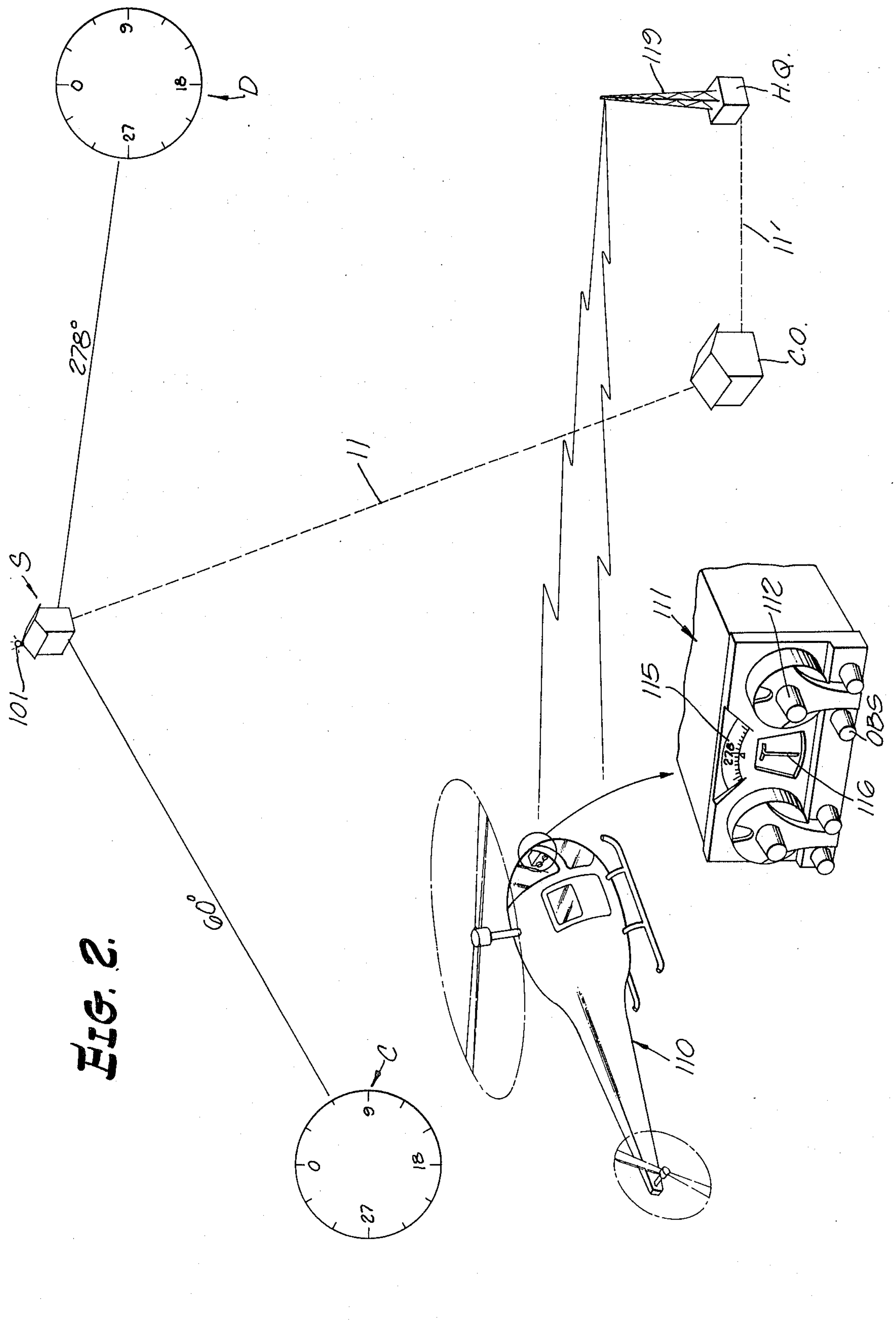

Referring now to the drawing in which a preferred embodiment of the invention is illustrated:

FIG. 1 is a schematic of a preferred embodiment of the portion of the alarm system installed on the premises or site being monitored; and FIG. 2 is a diagrammatic illustration of the mode of utilizing the direction finder equipment to guide airborne emergency personnel to the site of the emergency.

In FIG. 1, there is shown an illustrative embodiment of the invention alarm system designated generally 10, connected in circuit with a pair of public telephone lines 11 serving the premises to be monitored. Normally, phone lines 11 are connected in circuit with one or more telephones A by way of the contacts 4 and 6 of a master switch 12, it being understood the latter is in its downwardly closed position when the occupants of the premises are at home. As presently shown, the master switch is closed upwardly to deactivate the house phone A and to activate the burglar alarm proper.

Alarm 10 makes use of a second conventional telephone set B preferably located in some isolated part of the premises along with certain other components of the alarm. The hand piece 13 is retained off the cradle at all times. It will be understood that phone set B is connected to the telephone system service wires 11 and is in readiness to transmit a message over these wires should the system detect an emergency or the presence of an intruder or prowler during the absence of the premise occupants. Phone set B is provided with any suitable manually operable mechanical means for dialing another party's phone number or signalling the operator using either push buttons or a rotary dial type indicated generally at 14. This dial is notched at 15 to seat a pawl 16 pivoted at 17 to a supporting bracket 18. Notch 15 is located to hold the dial in armed or cocked position to dial the operator upon release of the pawl from the notch. A spring 19 normally urges pawl 16 into its locking position and against an adjustable stop 20.

To the right of phone set B is a casing 25 enclosing a spring driven timer 27 and a motor driven cam mechanism 29. Secured to the outer end of the timer shaft is a dial 30 equipped with an inverted U-shaped hand grip 31 for winding the timer clockwise, a small arc of rotation being quite adequate to time a three or four minute message transmitting cycle. As illustrated in the drawing, the timer is located in its cocked position and is held there by a latching detent 33 seating in notch 34 formed in the rim of dial 30. The latching detent is mounted at the upper end of a T-shaped operating member 36 pivoted to housing 25 on pivot pin 37. Located on the rim of dial 30 below notch 34 is a saw tooth shaped notch 39 having a long inclined camming surface terminating at the outer end of notch 34 and functioning ro guide latch member 33 into notch 34 automatically as the timer is rotated through a short arc clockwise from a stationary stop 41. This stop projects over the rim of dial 30 in position to engage the leg of handle 31 as the latter rotates counterclockwise during timer operation. Thus, as the timer runs down, dial 30 rotates counterclockwise until handle 31 engages stop 41.

Interconnecting the upper end of the phone dial latch 15 and timer latch 33 is a link 44. This link passes through a large opening between the legs of timer handle 31 and has one end pivoted to the upper end of a T-shaped member 36 and its left hand end pivoted to the phone dial latch 16 via a short lost motion connection 45. The lost motion connection is so proportioned as to permit either latch 15 or latch 30 to seat independently of one another thereby permitting the phone dial 14 to be latched in its cocked position shown in the drawing independently of timer dial 30. Likewise timer dial 30 can be latched in its cocked position as illustrated before or after phone dial 14.

The motor driven cam device 29 includes a suitable gear reduction means driving a shaft 49 to which is fixed a cam disc 50. For approximately 300° of its periphery cam 50 is of uniform radius. The opposite ends of this 300 degree arc taper toward one another and merge with a shorter radius arc. In its initial starting position, cam 50 is positioned as shown with the lower end of its right hand tapering surface *50a* resting against cam follower 54′ mounted on the right hand arm 55 of T-member 36. Arm 55 is then spaced from the outer end of the operating button 56 of microswitch 58 fixed to housing 25. Other details of cam 50 will be described presently in connection with the operation of alarm 10. Microswitch 60 has its cam follower 56′ in contact with arm 55 and controls the battery power supply for motor 63 driving the recycling endless magnetic tape reel 65 of tape recorder 66. The message recorded on tape 68 recirculates past a recording head 69 which is coupled in circuit with the service leads of telephone B via a small coupling capacitor 70.

Underlying and operable by the left hand arm 73 of T-member 36 is a microswitch 75 effective, when closed, to transmit the pre-recorded message on tape 68 to the central station phone operator over the regular phone service lines 11. Switch 75 is rigidly secured to housing 27 with its operating button positioned for operation by arm 73.

Switch 78, likewise mounted on housing 25, has its follower roller 79 in contact with the rim of timer dial 30. When the timer dial is cocked in the position illustrated, switch 78 is closed to the left and when the timer period ends follower rollers 79 seat in notch 80 of the timer dial, switch 78 is closed to the right. It will be understood that switches 78 and 58 cooperate in controlling the operation of the two halves of the cam motor cycle. This cycle includes one complete revolution of cam 50 performed in two halves of the timer cycle, the first half occuring simultaneously with the start of the timer cycle and the last half of the cam cycle occuring at the end of the timing cycle.

Referring now to the lower left hand corner of the drawing, a third group of switches will be observed comprising a master control switch 12, a motor lock-in switch 81, a test switch 83, and an alarm cycle switch 84. Switch 81 functions to maintain a power circuit to its first half cycle of operation and irrespective of whether the emergency or intruder sensing devices remain closed only for an instant or for a prolonged period, all as will become more evident below.

Master switch 82 controls the power supply to energize the automatic portion of the alarm system cycle, whereas test switch 83 is connected to a pilot light 85 and operates, when closed, to determine the condition of the various ones of the emergency or prowler detection switches or devices 86,86 of which there may be any desired number connected in parallel with one another. It will be understood that the emergency detectors or sensors include any of various devices for detecting an emergency condition including prowlers, fire, burst water conduits, heater failure and the like.

Microswitch 84 is an arming switch for the cam driving motor 29 and is held in armed condition by a latching solenoid 90. The armature 91 of the solenoid is spring biased outwardly urging its latch arm 92 to pivot counterclockwise about pivot 93 and in position to retain the latch member 94 pivoted in its clockwise position to hold switch 84 closed upwardly and switch 81 open. When the solenoid is energized only momentarily, its armature shifts to the left thereby disengaging the latches 92,94 and reversing the position of switches 81,84. Test switch 83 is closed only by holding button 102 depressed while the latches 92,94 are engaged for the purpose of checking to determine that each of detector switches 86 is in open position.

Another important feature of the invention is the provision of an intermittent flashing beacon 100 of any conventional type having a brilliant lamp 101 positioned to be readily observed from the sky as well as from either lateral side. Flasher 100 is preferably located on the roof of the premises or in some other prominent support and connected to a power source such as the battery 105 and is particularly useful in providing a visual warning observable during the nighttime from a considerable distance and particularly by law enforcing personnel using helicopters or the like for surveillance and rapid travel to the site of a burglary.

Referring now to FIG. 2, there is diagrammatically illustrated the manner in which police or other emergency personnel airborne in helicopter 110 and providing vigilance for the community in which alarm site S is located receives the emergency message and then utilizes the information to proceed directly to site S. The two nearest direction finder range stations C and D to site S are located at the centers of the respective compass roses with the zero position of each pointing North. Helicopter 110 is equipped with one and preferably two identical receivers 111, only one such instrument being illustrated, having a control knob 112 adjustable to receive the particular frequency on which any selected range station transmits. Each range station transmits a signal for each degree of the compass in succession. The receiver can be regulated to receive only a selected one of these successive bearing signals by turning knob OBS on the receiver until the associated dial 115 reads the desired bearing, such as the bearing 278° if the receiver is tuned to the frequency of range station D. Needle 116 will then deflect to the right or to the left to indicate whether the pilot is flying toward or away from that selected bearing signal, the magnitude of needle deflection indicating the departure from the desired flight course. When he is exactly on the bearing needle 116 will be in its upright or null position. If the pilot has two instruments as is customary, the second instrument is set similarly to guide the pilot to intersect bearing 60°. If the needle of one receiver reaches a null position before the other, the pilot remains on that bearing until the second needle is in its null position. When both needles are in null position, the pilot knows he is at the intersection of the two bearings, or at the site S of the emergency.

Dotted line 11 represents the telephone connection between site S and the central office C.O. of the telephone system, whereas dotted line 11' represents a telephone connection between the central office and police headquarters H.Q. provided with radio transmitting equipment 119 for transmitting the direction finder bearings and any other pertinent information to the crew of the airborne craft 110.

OPERATION

The described alarm is readily installed in a home, office or other building by connecting the usual service telephone sets A in circuit with the alarm phone set B in the manner shown in the drawing. The service telephones operate in the usual manner and it is unnecessary to take any precautions or to perform any operation on these phones when turning the premises over to the control of the invention alarm system. Nor is it necessary to perform any operations on the phone set B other than to leave hand piece 13 off the cradle.

To set the alarm in readiness to detect intruders, the operator places his finger in the last or "operator" dialing finger hole 106 of dial 14 on phone set B and rotates the dial clockwise until his finger engages stop 107 whereupon pawl 16 engages in notch 15 of the dial and holds the dial cocked in readiness to transmit an operator dialing signal over the line should the alarm detect the presence of an intruder on the premises. The operator next grasps operating handle 31 of spring timer 27 and rotates the latter clockwise through a small arc to wind the spring driving the timer thereby causing detent 33 of T-member 36 to engage in notch 34 to hold the timer in armed condition.

The next operation is to arm solenoid 90 to arm the intruder detecting switches 86,86. This is accomplished simply by pressing inwardly on button 102 until latch 92 engages behind latch 92 as is illustrated in the drawing and leaving the switches 81 and 83 open whereas switch 84 shifts to its upper closed position.

The operator then checks the alarm to make certain that it is conditioned to give an alarm should an intruder close any one of switches 86. He first makes certain that master switch 12 is closed downwardly to its open position against contacts 2 and 4 and then applies light pressure to the solenoid control button 102 to close the contact of the test switch 83. If the pilot light 85 lights it is known that one or more of the intruder detection switches 86 is closed and not properly conditioned for intruder detection operation. The operator then carefully checks each one of the switches to find which one or more of them is inoperative or closed and corrects the errant condition before again checking in the same manner as before by depressing button 102 and noting whether pilot lamp 85 remains unlighted when he closes switch 83. If it does, he knows that the alarm system is in operative condition whereupon he shifts master switch 12 upwardly to its alarm activating position with its switch blades closed against contacts 1 and 3. All switches and parts are then in the position shown in the drawing and the system is ready to detect the presence of an intruder on the premises.

Closing any one of the detection switches 86, as by stepping on it or opening some door or window protected thereby, activates the circuit to solenoid coil 90 and instantly releases latches 92,94 and reverses the position of switches 81,84. In this connection it will be observed that switches 86 control the supply of power to the solenoid from battery 105 via contacts 1 and 5 of master switch 12, through closed switch 84 to the solenoid coil and back to the other side of battery 105. Instantly that this occurs the solenoid armature 91 shifts to the left releasing latch 94 from latch 92 to close switch 81. The closing of switch 84 downwardly to its lower contact completes a power circuit from battery 105 through contacts 5, 1 of master switch 12, switch 84, and thence through cam motor 29 back to the other side of the battery. Closed switch 81 then acts as a holding switch to maintain the power supply to motor 29 and flashing light 100 while cam disc 50 turns through its first half cycle from the position illustrated.

As cam motor 29 rotates slowly counterclockwise from its starting position, the rising cam surface 50b acts on cam follower 54' to pivot T-member 36 clockwise about pivot 37 to operate switches 75,60 and 58 in sequence and in that order.

As switch 75 closes, it completes a circuit placing phone set B in circuit with the outgoing telephone lines 11 via contact 6,3 of master switch 12 and in readiness to signal the operator and to transmit to her the message stored on magnetic tape 68. At the same time latches 16,33 are released from their respective retaining notches 15,34 thereby permitting timer 27 to start a timing cycle and the dial of phone B to rotate and signal the central operator. As the operator is alerted, the pretaped message passes a reproducing head 69 transmitting inaudible instruments via the coupling capacitor 70 over telephone lines 11,11 to the listening operator. An appropriate message is thereby transmitted and repeated several times giving explicit instructions respecting the address from which the message originates, the fact that prowlers are present on the premises and advising that the presence of police is urgently needed. While this message is being transmitted cam 50 is operating to rotate T-member 36 further and further clockwise until actuating button 56 of microswitch 58 thereby closing the latter downwardly to deactivate the cam motor after approximately ½ revolution of cam 50. Timer 27 continues to operate for the prescribed period of time, such as three minutes, during which recorder 66 repeats the message on the tape several times.

As timer dial handle 31 approaches stop 41, roller 79 of microswitch 78 enters depression 80 on the rim of the timer dial, thereby shifting switch 78 to its alternate position. Since switch 58 is already closed to its downward position, the closing of switch 78 against its right hand contact completes a new power circuit to the then deactivated cam motor 29 by way of switch 84 and switch 58. The reactivation of cam motor 29 continues the counterclockwise rotation of cam 50 until its high portion passes cam follower 54' onto the declining portion **50*a* of the cam thereby allowing switches 75,60 and 58 to shift position back to their initial positions. In other words, a full cycle of approximately 360° of the cam has now been completed. All switches associated with timer 27 and motor 29 are now restored to their original positions. The flashing roof beacon remains in operation until master switch 12** is manually opened.

The information stored on tape 58 including the range finder bearing from the two range stations C and D closest to alarm site S are relayed from the telephone central office C.O. to police headquarters H.Q. or other emergency headquarters. This information is then transmitted via radio equipment 119 directly to the airborne emergency personnel in helicopter 110. The bearing information is then utilized in the manner described above and in accordance with direction finder navigational procedure to guide personnel aboard that craft along the shortest course directly to the intersection of bearings 60° and 278°, or the location of the emergency. During the night-time the aircraft is guided additionally by the distinctive flashing light 101 clearly visible from a long distance to the crew of the craft. As the crew reaches the site powerful lights customarily present on such craft can be employed to floodlight the area and aid the apprehension of intruders and responsive activities for the emergency.

The operating cycle of the alarm is complete and the operator may manually reset it in the manner first described to place it in standby condition to detect an unauthorized movement of a prowler about the premises.

Normally the alarm is activated during the absence from the premises of the occupants and, in this case, upon their return home, the alarm is deactivated merely by shifting switch 12 to its alternate position from that shown, thereby restoring phone set A and any others connected in parallel therewith to normal duty and deactivating phone set B. All other parts of the alarm remain in readiness to resume active duty merely by first holding switch button 102 depressed to make certain that the intruder detectors 86 are in open position. This having been determined, phone A is disconnected and the entire alarm system is restored to standby monitoring operation simply by closing master switch 12 upwardly against contacts 1 and 3. All other parts of the alarm were previously conditioned and armed, and, for this reason, nothing further is required. However, if the alarm has been set in operation while on monitoring duty, it is necessary to rearm the various components in the manner described in detail above before reclosing master switch 12.

While the particular silent alarm system and means for directing airborne personnel to emergency site herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That improvement in an emergency alarm system for summoning assistance to the site of an emergency which comprises: utilizing sensor means on the site for detecting an emergency condition and in response to activation thereof completing a telephone circuit to a remote manned telephone station, and transmitting thereover via telephone a pre-recorded message respecting the nature of the emergency and the geographical location thereof.

2. That improvement defined in claim 1 characterized in the step of employing said sensor means to activate signal light means located for viewing by emergency personnel distant from the site and endeavoring to respond to the emergency alarm.

3. That improvement defined in claim 1 characterized in the step of including in the transmitted emergency message a bearing from each of two local direction finders which bearings intersect at said site.

4. That improvement defined in claim 3 characterized in the step of utilizing the activation of said sensor means to energize a powerful light source located on the site and distantly visible to supplement said intersecting bearing information in guiding airborne emergency personnel to the site of the emergency.

5. That improvement in directing public emergency personnel to the site of an emergency which comprises: storing information identifying a pair of direction finder vectors from separate direction finder stations local to a selected site and intersecting at that site, and transmitting to a remote station monitoring the area for emergency alarms the stored vector information automatically in response to the happening of an emergency at said site for the guidance of personnel endeavoring to locate and proceed to the site of the emergency.

6. That improvement defined in claim 5 characterized in activating signal light means substantially contemporaneously with the transmission of the stored vector information and which signal light means is exposed to view to emergency personnel from a distance as they proceed toward the site.

7. That improvement defined in claim 5 characterized in the utilization of a helicopter by emergency personnel to proceed to the site of the emergency by the use of guidance signals transmitted to the helicopter from said direction finder stations.

8. That improvement defined in claim 5 characterized in the use of a public telephone system to transmit the stored direction finder information from the site of the emergency to public emergency personnel.

9. That improvement defined in claim 5 characterized in the use of magnetic tape to store said direction finder information, and silently introducing said tape-stored information into a telephone system and to emergency personnel via said telephone system.

10. That improvement defined in claim 9 characterized in dispatching airborne emergency personnel to the site of the emergency utilizing the transmitted direction finder information and signals from paid direction finder stations to guide said airborne personnel to the site.

11. That improvement defined in claim 10 characterized in operating intermittently flashing signal light means located at the emergency site and visible from the air as an aid in guiding emergency personnel to the site.

12. A silent alarm for transmitting a recorded message respecting the location of said silent alarm to a phone operator upon the occurrence of an emergency, said alarm comprising: a phone set having means thereon for signalling an operator, means for arming said operator signalling means, power operated recorder means having a recorded emergency message, motor-driven cycle control means including timer means operatively connected to said power-operated recorder means and operable to initiate and to terminate the operation of said recorder means, means operatively interconnecting said cycle control means and said means for arming said operator signalling means thereby to operate the latter in time delay sequence following the actuation of said cycle control means, and means including emergency condition sensor means for initiating operation of said cycle control means upon sensing an emergency condition and inaudibly to introduce said recorded message into a public telephone line following signalling of the operator via said operator signalling means on said phone set.

13. A silent alarm as defined in claim 12 characterized in the provision of manually settable solenoid-released means connected in circuit with said cycle control means and with said sensor means, and operable to energize said cycle control means when said sensor means senses an emergency condition.

14. A silent alarm as defined in claim 12 characterized in that said cycle control means includes spring-powered timer means for activating said operator signalling means in time-delay sequence following initiation of the operation of said cycle control means.

15. A silent alarm as defined in claim 12 characterized in the provision of flasher light means exposed to view from the exterior of the premises on which said alarm is located and connected to said alarm for activation thereby when an emergency is sensed by said sensor means.

16. A silent alarm as defined in claim 15 characterized in that said recorded message includes information identifying a pair of direction finder vectors from separate local direction finder stations and which vectors intersect at the site of the alarm thereby enabling airborne emergency officials to proceed to the site of the emergency.

17. An alarm system utilizing airborne direction finder apparatus for responding to an alarm emanating from a particular site, said system comprising: sensor means at the site including means responsive to a sensed emergency to signal a phone operator over a public telephone system and to relay to that operator a recorded message including the site address and a pair of vectors from identified local direction finder stations intersecting at the alarm site and usable by airborne emergency personnel equipped with direction finder receiving apparatus to proceed directly to the alarm site.

18. An alarm system as defined in claim 17 characterized in that said phone operator signalling means includes cycle control means in circuit with said sensor means and energized in response to an emergency condition detected by said sensor means, and said cycle control means being operable when activated to introduce said recorded message inaudibly into a public telephone system for relay to airborne emergency personnel.

* * * * *